United States Patent
Kataoka et al.

(10) Patent No.: US 10,664,491 B2
(45) Date of Patent: May 26, 2020

(54) NON-TRANSITORY COMPUTER-READABLE RECORDING MEDIUM, SEARCHING METHOD, AND SEARCHING DEVICE

(71) Applicant: FUJITSU LIMITED, Kawasaki-shi, Kanagawa (JP)

(72) Inventors: Masahiro Kataoka, Kamakura (JP); Kiichi Yamada, Numazu (JP); Haruyasu Ueda, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 424 days.

(21) Appl. No.: 15/187,995

(22) Filed: Jun. 21, 2016

(65) Prior Publication Data
US 2017/0017707 A1    Jan. 19, 2017

(30) Foreign Application Priority Data
Jul. 13, 2015 (JP) ................................. 2015-139997

(51) Int. Cl.
  *G06F 16/25* (2019.01)
  *G06F 16/245* (2019.01)
  *G06F 16/31* (2019.01)

(52) U.S. Cl.
  CPC .......... *G06F 16/258* (2019.01); *G06F 16/245* (2019.01); *G06F 16/31* (2019.01)

(58) Field of Classification Search
  CPC ......... G06F 17/30569; G06F 17/30424; G06F 17/30613; G06F 16/258; G06F 16/245; G06F 16/31
  See application file for complete search history.

(56) References Cited

U.S. PATENT DOCUMENTS 6,502,064 B1 *   12/2002   Miyahira ............ G06F 17/2735
                                                        341/106
2007/0041447 A1    2/2007   Burazerovic et al.
2008/0127122 A1 *   5/2008   Greiner ............... G06F 9/30181
                                                        717/136

FOREIGN PATENT DOCUMENTS

| CN | 1774931 A | 5/2006 |
|---|---|---|
| JP | 7-287716 | 10/1995 |
| JP | 11-85459 | 3/1999 |
| JP | 11-143877 | 5/1999 |

OTHER PUBLICATIONS

Extended European Search Report dated Nov. 24, 2016 in Patent Application No. 16175430.4.
Chinese Office Action dated Feb. 25, 2019, issued in corresponding Chinese patent application No. 201610546697.1.
(Continued)

*Primary Examiner* — Loc Tran
(74) *Attorney, Agent, or Firm* — Xsensus LLP

(57) ABSTRACT

A searching device converts a searching data into an encoded searching data in a first encoding format according to a first encoding rule; and searches the encoded searching data in a target encoded data that has been encoded into the first encoding format by the first encoding rule, or that has been encoded in a second encoding format wherein when a specific encoded data encoded in the second encoding format is detected in the searching, the searching compares the encoded searching data and a converted encoded data, the converted encoded data being the specific encoded data converted into the first encoding format based on a predetermined conversion rule.

6 Claims, 7 Drawing Sheets

(56) References Cited

OTHER PUBLICATIONS

EP-OA dated May 14, 2019 for the corresponding European patent application No. 16175430.4.
Japanese Office Action dated May 28, 2019, in corresponding Japanese Patent Application No. 2015-139997.
EP Office Action dated Mar. 13, 2020 for the corresponding European patent application No. 16175430.4, 8 pages.

* cited by examiner

FIG.5

| WORD | TWO-BYTE CODE | THREE-BYTE CODE |
|---|---|---|
| a△ | 0700h | 900000h |
| able△ | 0701h | 90023Fh |
| about△ | 0702h | 90041Ah |
| ... | ... | ... |
| | 07FFh | |
| | 0800h | |
| | 0801h | |
| | ... | |

60

NON-TRANSITORY COMPUTER-READABLE RECORDING MEDIUM, SEARCHING METHOD, AND SEARCHING DEVICE

CROSS-REFERENCE TO RELATED APPLICATION(S)

This application is based upon and claims the benefit of priority of the prior Japanese Patent Application No. 2015-139997, filed on Jul. 13, 2015, the entire contents of which are incorporated herein by reference.

FIELD

The embodiment discussed herein is related to a searching check program and the like.

BACKGROUND

Conventionally, when searching text data for a character string, text data and the character string are compared to determine whether the text data includes a character string that matches the character string. When the text data is compressed data, for example, the text data and the character string are not corresponding to each other, and accordingly, comparison with the character string is performed after the compressed data is decompressed.

There also is a case in which text data and a character string are encoded by an encoding scheme to improve the compression ratio. When text data and a character string are encoded based on the same encoding scheme, the text data and the character string can be compared directly without decoding (Japanese Laid-open Patent Publication Nos. 7-287716 and 11-143877).

However, in the above conventional technique, while the compression ratio can be improved if a specific character or word is allocated to a different encoding scheme, comparison in the encoding scheme cannot be processed at high speed.

Generally, character encoding schemes used when encoding text data can have redundant structure, and a character or word can be assigned to a code different from a code defined in a predetermined character encoding scheme. For example, a million words can be allocated to a three-byte code. To further improve the compression ratio, some words and characters appearing at high frequency can be converted into a one-byte code or two-byte code, not three-byte code.

When some words or characters appearing at high frequency are converted into the one-byte code or the two-byte code as described above, for example, text data including the one-byte code, the two-byte code, and the three-byte code mixed therein and text data in which a search character string is encoded into the three-byte code cannot be compared without processing, hindering to achieve high-speed processing.

SUMMARY

According to an aspect of an embodiment, a non-transitory computer-readable recording medium stores therein a searching program that causes a computer to execute a process including converting a searching data into an encoded searching data in a first encoding format according to a first encoding rule; and searching the encoded searching data in a target encoded data that has been encoded into the first encoding format by the first encoding rule, or that has been encoded in a second encoding format wherein when a specific encoded data encoded in the second encoding format is detected in the searching, the searching compares the encoded searching data and a converted encoded data, the converted encoded data being the specific encoded data converted into the first encoding format based on a predetermined conversion rule.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 depicts one example of a data structure of a code conversion table;

DESCRIPTION OF EMBODIMENT(S)

Preferred embodiments of the present invention will be explained with reference to accompanying drawings.

Figure 1:
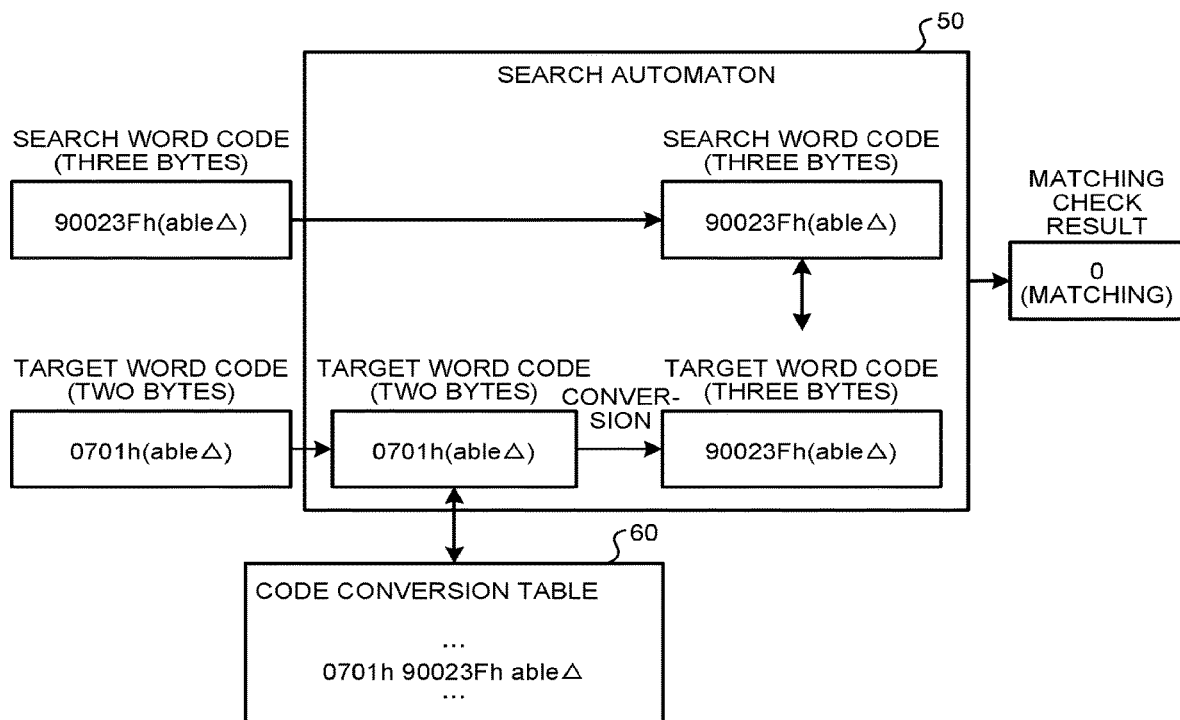
FIG. 1 depicts one example of processing performed by a searching device according to a present embodiment.

FIG. 1 depicts one example of processing performed by a searching device according to the present embodiment. For example, in text data handled by the searching device, some characters and words appearing at high frequency are converted into two-byte codes, not three-byte codes. Therefore, in the text data, the three-byte code and the two-byte code are mixed.

Accordingly, for example, when the code of each search word included in a character string of a subject of search is the three-byte code and the code of each word to be target is two-byte, respective codes cannot be directly compared and comparison processing cannot be performed at high speed in a conventional technique. To solve this problem, the search device according to the present embodiment performs the following processing. In the explanation below, a code corresponding to a word with a space included in a search character string is expressed as search word code. Moreover, a code corresponding to a word with a space included in text data is expressed as target word code.

In FIG. 1, the three-byte search word code is "90023Fh" as one example. This search word code "90023Fh" corresponds to a word "ableΔ". "Δ" corresponds to a space.

Furthermore, a two-byte target word code included in text data to be a subject of search is "0701h". This target word code "0701h" corresponds to a word "ableΔ". As the search word code is a three-byte code and the target word code is a two-byte code, the searching device cannot compare the search word code and the target word code as they are.

The searching device inputs the search word code and the target word code to a search automaton 50. Receiving the two-byte target word code, the search automaton 50 compares the target word code with a code conversion table 60, and converts the two-byte target word code into a three-byte target word code. The code conversion table 60 associates a two-byte code and a three-byte code. In the example depicted in FIG. 1, the search automaton 50 converts the two-byte target word code "0701h" into a three-byte target word code "90023Fh".

The search automaton 50 compares the two-byte search word code and the three-byte target word code, and determines whether the word codes are matching. When the search word code and the target word code are matching, for example, the search automaton 50 outputs a matching check result "0". On the other hand, when the search word code and the target word code are not matching, the search automaton 50 outputs a matching check result "−1". In the example depicted in FIG. 1, the search automaton 50 outputs the matching check result "0" as the search word code "90023Fh" and the target word code "90023Fh" are matching.

As depicted in FIG. 1, the searching device according to the present embodiment converts a two-byte code into a three-byte code and then performs comparison when comparing text data that includes a two-byte code and a three-byte code mixed therein and a three-byte code to be a subject of matching check. By the searching device performing such a process, search in an encoding system can be processed at high speed.

Figure 2:
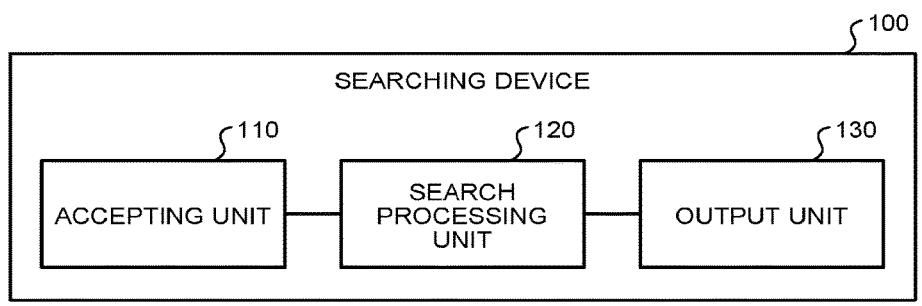
FIG. 2 is a functional block diagram depicting a configuration of the searching device according to the present embodiment.

FIG. 2 is a functional block diagram depicting a configuration of the searching device according to the present embodiment. As depicted in FIG. 2, for example, a searching device 100 includes an accepting unit 110, a search processing unit 120, and an output unit 130.

The accepting unit 110 is a processing unit that accepts text data and character string data subjected to matching check. In the following explanation, a character string subjected to matching check is appropriately expressed as a searching character string. The accepting unit 110 outputs the accepted text data and searching character string to the search processing unit 120.

When the accepting unit 110 accepts text data that has not been encoded, the accepting unit 110 may perform processing of converting each word included in the text data into a three-byte code based on a predetermined encoding rule. Moreover, the accepting unit 110 may perform processing of converting data that has not been encoded into a two-byte target word code based on a predetermined encoding rule.

The search processing unit 120 is a processing unit that performs search processing explained in FIG. 1 based on text data and searching character string data. For example, the search processing unit 120 converts a two-byte target word code into a three-byte target word code, and then performs search processing by comparing the search code and the target code.

The output unit 130 is a processing unit that outputs a matching check result obtained by the search processing unit 120. For example, the output unit 130 outputs information indicating whether text data includes a searching character string, a position of a searching character string present in text data, and the like.

Figure 3:
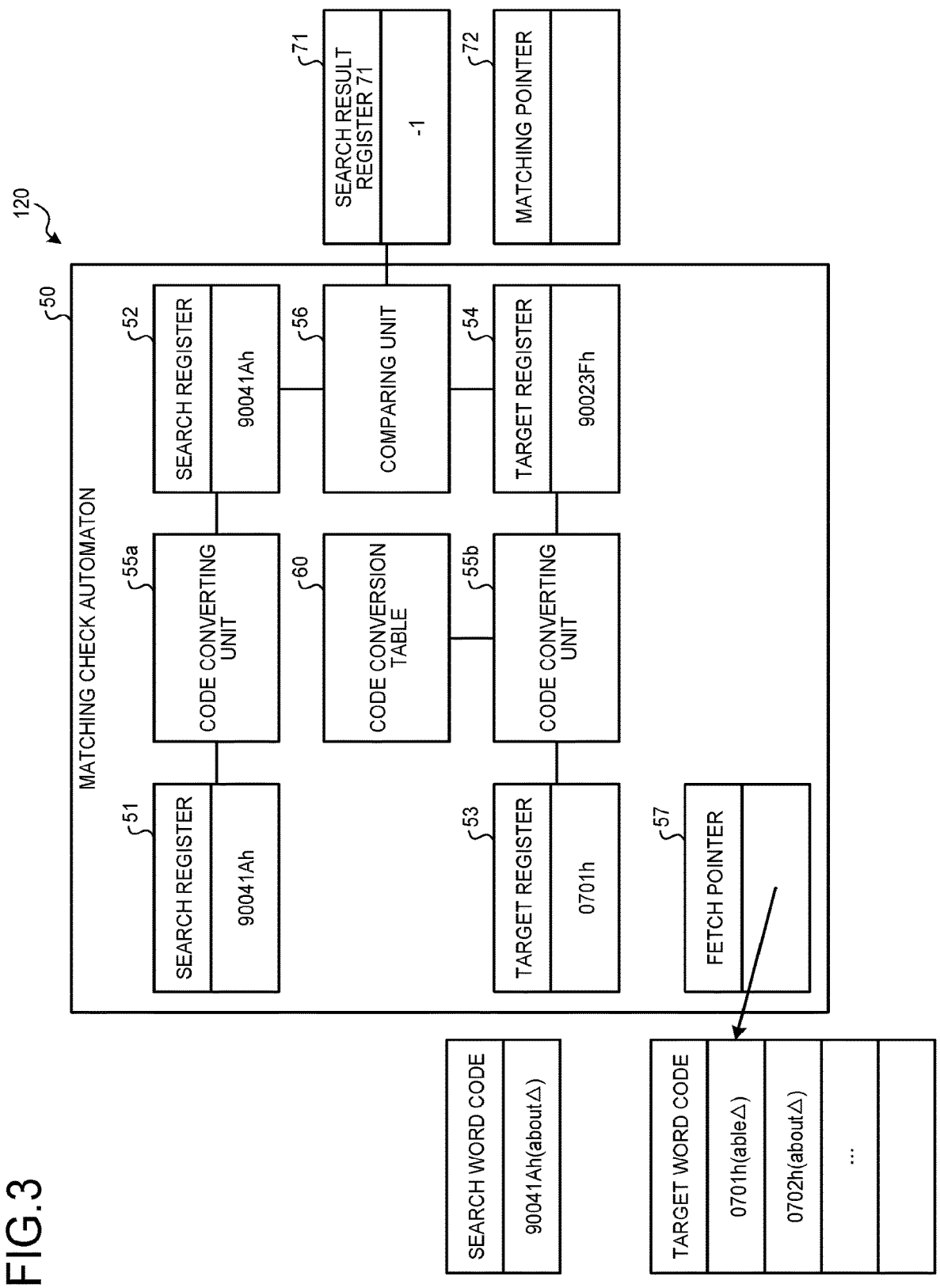
FIG. 3 is a functional block diagram (1) depicting a configuration of a searching processing unit.
Figure 4:
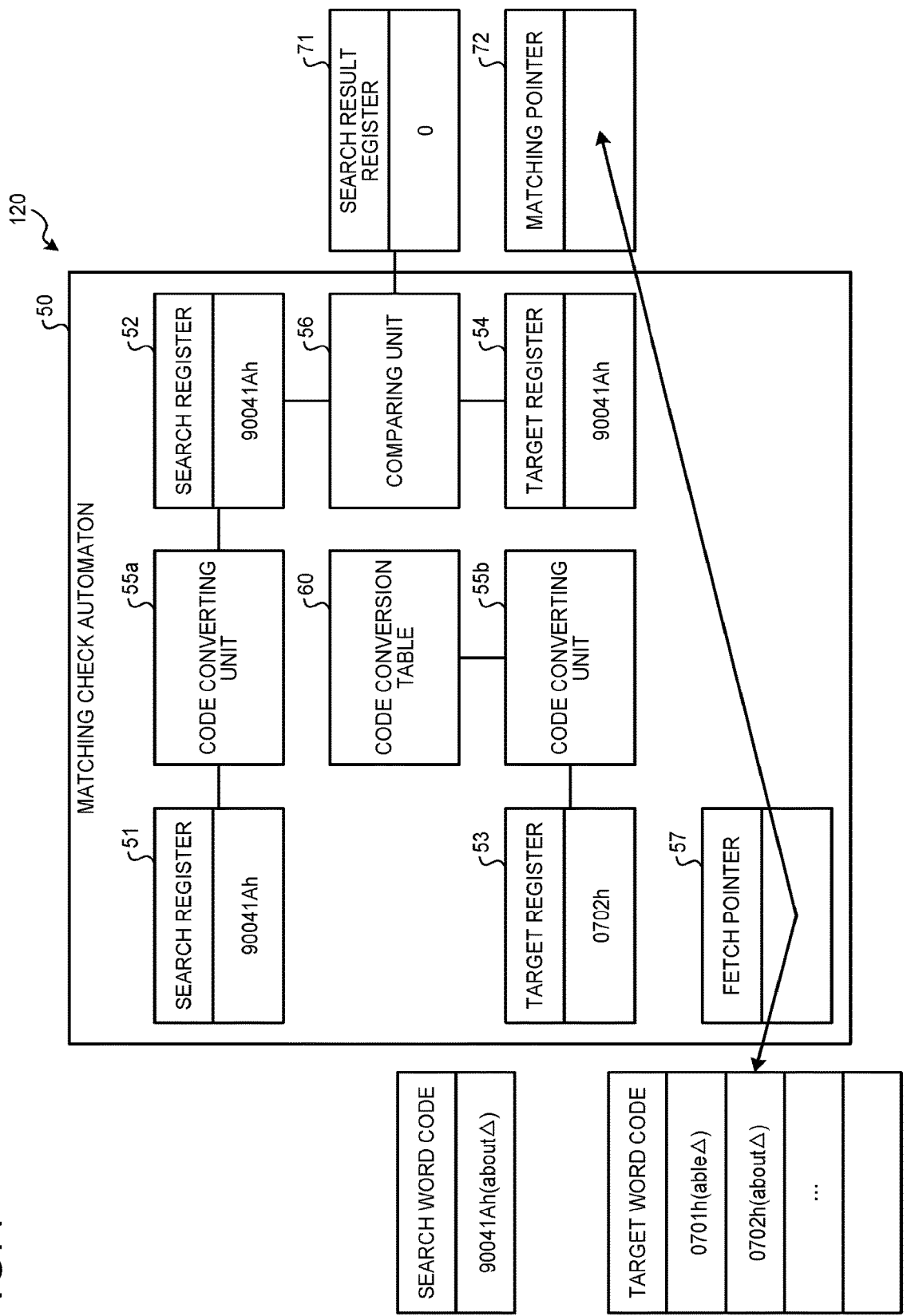
FIG. 4 is a functional block diagram (2) depicting a configuration of the searching processing unit.

FIG. 3 and FIG. 4 are functional block diagrams depicting a configuration of the search processing unit. As depicted in FIG. 3, this search processing unit 120 includes the search automaton 50, a search register 71, and a matching pointer 72. The search automaton 50 includes a search registers 51, 52, target registers 53, 54, code converting units 55a, 55b, a comparing unit 56, a fetch pointer 57, and the code conversion table 60.

The search register 51 is a storage unit that stores a three-byte search word code. The search automaton 50 acquires a search word code of a searching character string from the accepting unit 110, and stores in the search register 51.

The search register 52 is a storage unit that stores a three-byte search word code. The search register 52 acquires a search word code stored in the search register 51 through the code converting unit 55a, and stores the acquired search word code.

The target register 53 is a storage unit that stores a two-byte or three-byte target word code. The search automaton 50 acquires a target word code of text data from the accepting unit 110, and stores the acquired target word code in the target register 53. The search automaton 50 acquires a target word code at a position indicated by the fetch pointer 57 from the text data, and stores the code in the target register 53. Explanation about the fetch pointer 57 is described later.

The target register 54 is a storage unit that stores a three-byte target word code. The target register 54 acquires a three-byte target word code through the code converting unit 55b, and stores the acquired target word code.

The code converting unit 55a is a processing unit that acquires a search word code stored in the search register 51, and that outputs the acquired search word code to the search register 52.

The code converting unit 55b is a processing unit that acquires a three-byte or two-byte target word code stored in the target register 53, and that outputs the target word code subjected to code conversion to the target register 54. In the following, processing when the code converting unit 55b acquires a three-byte target word code and processing when the code converting unit 55b acquires a two-byte target word code are explained.

When acquiring a three-byte target word code, the code converting unit 55b outputs the target word code as it is to the target register 54 without subjecting the target word code to code conversion.

When acquiring a two-byte target word code, the code converting unit 55b compares the code conversion table 60 and the two-byte target word code, and converts the two-byte target word code into a three-byte target word code. The code converting unit 55b outputs the three-byte target word code to the target register 54.

FIG. 5 depicts one example of a data structure of the code conversion table. As depicted in FIG. 5, this code conversion table 60 associates a word, a two-byte code, and a three-byte code. In the example depicted in FIG. 5, the two-byte code corresponding to a word "aΔ" is "0700h". Moreover, the three-byte code corresponding to a word "aΔ" is "900000h".

The code converting unit 55b compares a column of the two-byte code in the code conversion table 60 and a target word, to retrieve a hit record, and converts the target word code into the three-byte code of the retrieved record.

The processing performed by the code converting unit 55b is explained, assuming that the target word code is, for example, "0701h". When the code converting unit 55b compares the target word code "0701h" with the column of the two-byte code of the code conversion table 60, a record of the word "ableΔ" is hit. The three-byte code corresponding to the record of the word "ableΔ" is "90023Fh". Therefore, the code converting unit 55*b* converts the two-byte target word code "0701h" into the three-byte target word code "90023Fh".

Explanation returns to FIG. 3. The comparing unit 56 is a processing unit that compares a three-byte search word code stored in the search register 52 and a three-byte target word code stored in the target register 54, and that outputs a result of comparison to the matching-check result register 71.

For example, the comparing unit 56 outputs the matching check result "0" to the matching-check result register 71 when a three-byte search word code stored in the search register 52 and a three-byte target word code stored in the target register 54 are matching. On the other hand, the comparing unit 56 outputs the matching check result "−1" to the matching-check result register 71 when a three-byte search word code stored in the search register 52 and a three-byte target word code stored in the target register 54 are not matching.

The fetch pointer 57 is a storage unit that holds position information of a target word code to be stored in the target register 53 out of respective target word codes included in text data. An initial value of the fetch pointer 57 is, for example, position information of a target word code at the head among the respective target word codes included in the text data. The search automaton 50 updates the position information of the fetch pointer to a position of a following target word code in the text data, each time comparison by the comparing unit 56 is finished.

The matching-check result register 71 is a storage unit that acquires a matching check result from the comparing unit 56, and that stores the acquired matching check result.

The matching pointer 72 is a storage unit that holds position information of a target word code, in text data, that matches a search word code. For example, the search processing unit 120 stores, in the matching pointer 72, the position information stored in the fetch pointer 57 when the matching check result "0" is stored in the target register.

Next, one example of processing performed by the search automaton 50 is explained. First, processing when a three-byte search word code "90041Ah (aboutΔ)" is stored in the search register 51 and processing when the two-byte target word code "0701h (ableΔ) is stored in the target register 53 are explained. As depicted in FIG. 3, the position information in the fetch pointer 57 is assumed to indicate a position of the target word code "0701h (ableΔ).

The code converting unit 55*a* stores the three-byte search word code "90041Ah (aboutΔ)" that has been stored in the search register 51 in the search register 52.

The code converting unit 55*b* acquires the two-byte target word code "0701h" that is stored in the target register 53, and converts the code into the three-byte target word code "90023Fh", referring to the code conversion table 60. The code converting unit 55*b* stores the three-byte target word code "90023Fh" in the target register 54.

The comparing unit 56 compares the three-byte search word code "90041Ah" stored in the search register 52 and the three-byte target word code "90023Fh" stored in the target register 54. The comparing unit 56 outputs the matching check result "−1" to the matching-check result register 71 as the search word code "90041Ah" and the target word code "90023Fh" are not matching.

Subsequently, processing when the three-byte search word code "90041Ah (aboutΔ)" is stored in the search register 51 and the two-byte target word code "0702h (aboutΔ)" is stored in the target register 53 is explained using FIG. 4. As depicted in FIG. 4, the position information of the fetch pointer 57 is assumed to indicate the target word code "0702h (aboutΔ)".

The code converting unit 55*a* stores the three-byte search word code "90042Ah (aboutΔ)" that has been stored in the search register 51 in the search register 52.

The code converting unit 55*b* acquires the two-byte target word code "0702h" that is stored in the target register 53, and converts the code into the three-byte target word code "90041Ah", referring to the code conversion table 60. The code converting unit 55*b* stores the three-byte target word code "90041Ah" in the target register 54.

The comparing unit 56 compares the three-byte search word code "90041Ah" stored in the search register 52 and the three-byte target word code "90041Ah" stored in the target register 54. The comparing unit 56 outputs the matching check result "0" to the matching-check result register 71 as the search word code "90041Ah" and the target word code "90041Ah" are matching. The search processing unit 120 stores, in the matching pointer 72, the position information stored in the fetch pointer 57 as the matching check result "0" is stored in the search register 71.

The search processing unit 120 stores search word codes included in a searching character string in the search register 51, and repeats the processing described above, thereby determining whether the searching character string is included in text data. The search processing unit 120 outputs the matching check result to the output unit 130. The matching check result includes, for example, information indicating whether a searching character string is included and the position information in text data including the searching character string.

Figure 6:
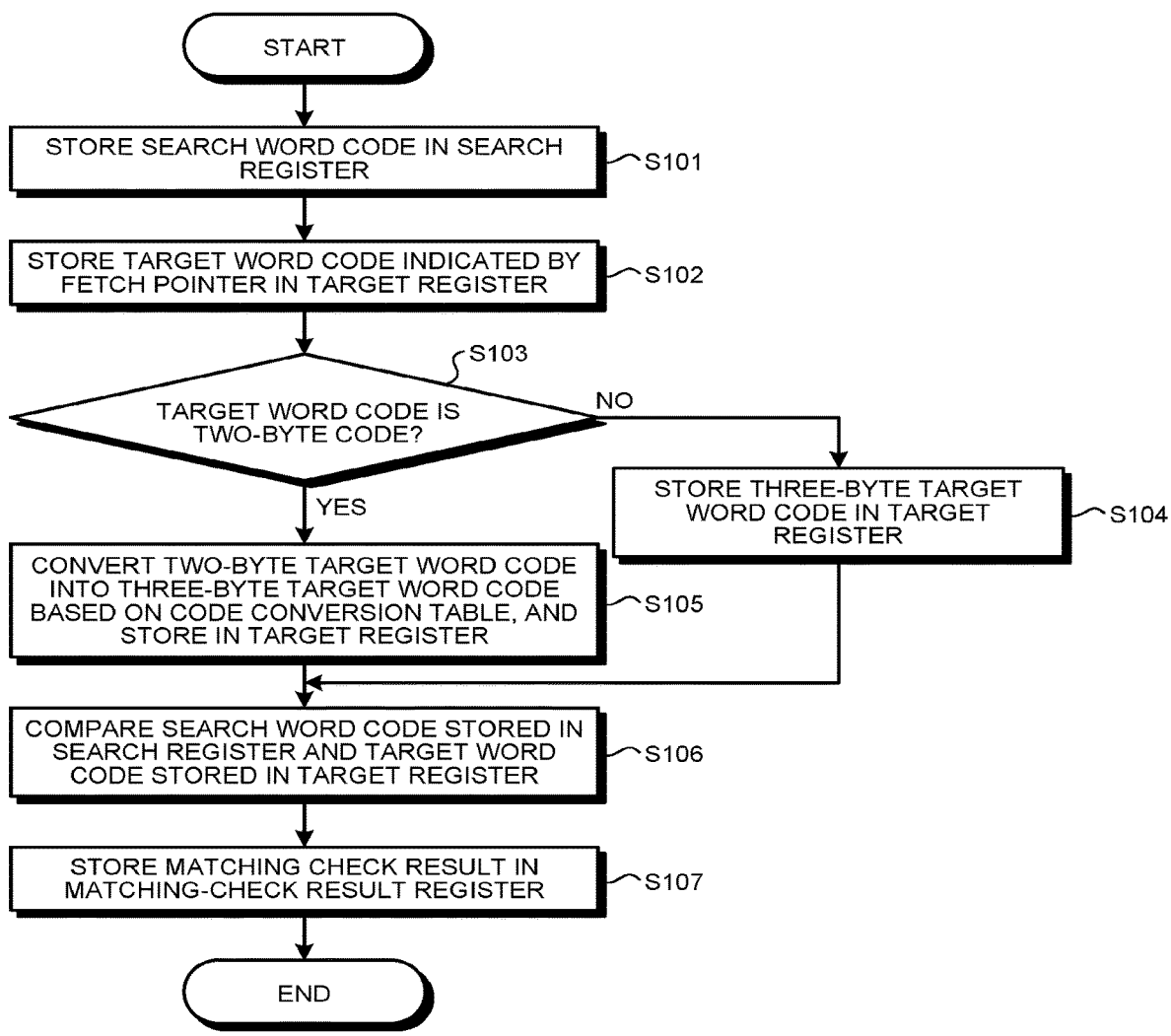
FIG. 6 is a flowchart of a processing procedure of the searching processing unit according to the present embodiment.

FIG. 6 is a flowchart of a processing procedure of the search processing unit according to the present embodiment. As indicated in FIG. 6, the search processing unit 120 stores a search word code of a searching character string in the search register 51 (step S101). The search word code stored in the search register 51 at step S101 is thereafter stored in the search register 52.

The search processing unit 120 stores a target word code indicated by a fetch pointer in the target register 53 (step S102). The code converting unit 55*b* of the search processing unit 120 determines whether the target word code stored in the target register 53 is a two-byte code (step S103).

When the target word code stored in the target register 53 is a three-byte code (step S103: NO), the code converting unit 55*b* stores, in the target register 54, the three-byte target word code in the target register 53 (step S104). The search processing unit 120 then shifts to step S106.

On the other hand, when the target word code stored in the target register 53 is a two-byte code (step S103: YES), the code converting unit 55*b* performs the following processing. The code converting unit 55*b* converts the two-byte target word code into a three-byte target word code based on the code conversion table 60, and stores the code in the target register 54 (step S105).

The comparing unit 56 of the search processing unit 120 compares the search word code stored in the search register 52 and the target word code stored in the target register 54 (step S106). The search processing unit 120 stores the matching check result in the matching check resister 71 (step S107). When the matching result "0" is stored in the search register 71 at step S107, the search processing unit 120 stores the position information stored in the fetch pointer 57, in the matching pointer 72.

Next, an effect of the searching device 100 according to the present embodiment is explained. When comparing text data including a two-byte target word code and a three-byte target word code mixed therein with a three-byte search word code, the searching device 100 converts the two-byte target word code into a three-byte code, and then performs comparison. The searching device 100 performs the processing as described, thereby enabling matching check at high speed even when matching check is performed in an encoding system for text data with improved compression ratio including a two-byte code and a three-byte code mixed therein.

While a target word code has been explained as a two-byte code in the present embodiment as one example, not limited thereto, it may be one-byte code. In this case, the search processing unit 120 compares a target word code and the code conversion table 60 to convert the one-byte target word code into a three-byte target word code, and then compares the search word code and the target word code.

Figure 7:
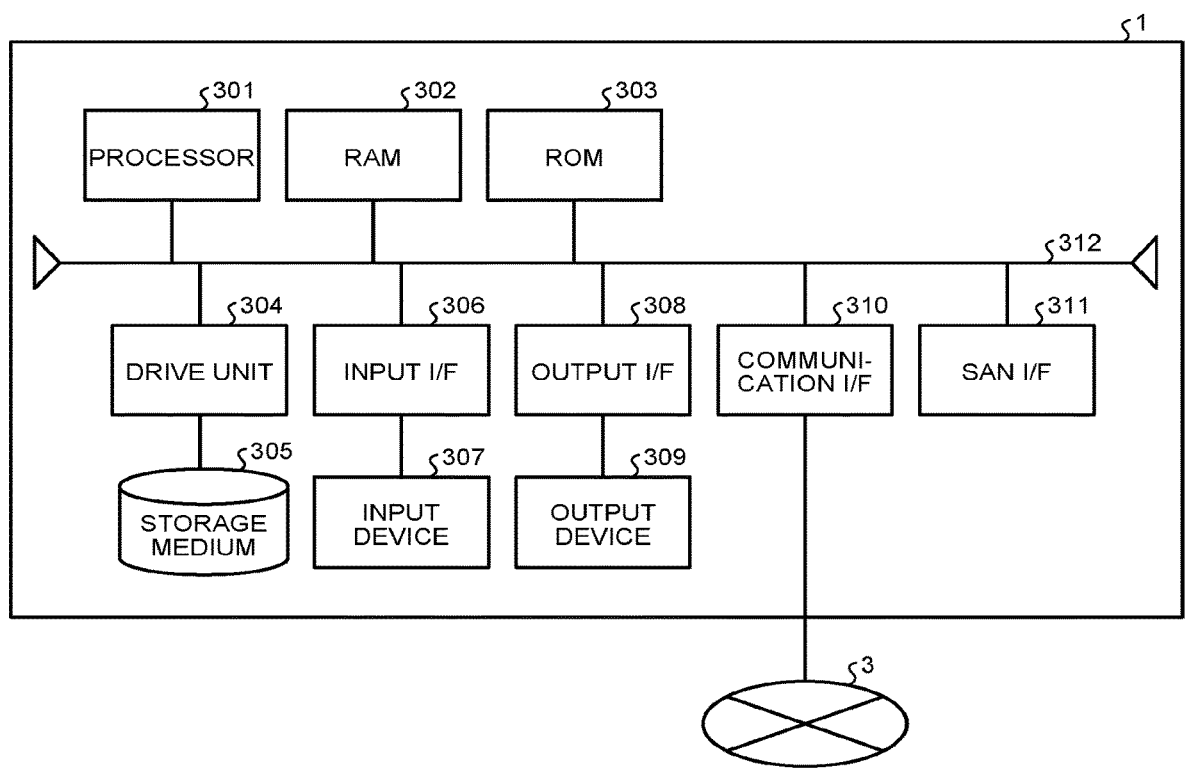
FIG. 7 depicts a hardware configuration example of a computer.

In the following, hardware and software used in the present embodiment are explained. FIG. 7 depicts a hardware configuration example of a computer 1. The computer 1 includes, for example, a processor 301, a random access memory (RAM) 302, a read only memory (ROM) 303, a drive unit 304, a storage medium 305, an input interface (I/F) 306, an input device 307, an output I/F 308, an output device 309, a communication I/F 310, a storage area network (SAN) I/F 311, a bus 312, and the like. The respective hardware components are connected through the bus 312.

The RAM 302 is a readable and writable memory device, and a semiconductor memory such as a statistic RAM (SRAM) and a dynamic RAM (DRAM), or a flash memory although it is not RAM, is used. The ROM 303 includes a programmable ROM (PROM) and the like. The drive unit 304 is a device that performs at least one of read or write of information recorded in the storage medium 305. The storage medium 305 stores information written by the drive unit 304. The storage medium 305 is, for example, a hard disk, a flash memory such as a solid state drive (SSD), or a storage medium such as a compact disc (CD), a digital versatile disc (DVD), and a Blu-ray disc. Moreover, for example, the computer 1 provides the drive unit 304 and the storage medium 305 for each of various kinds of storage media.

The input I/F 306 is a circuit that is connected to the input device 307, and that transmits an input signal received from the input device 307 to the processor 301. The output I/F 308 is a circuit that is connected to the output device 309, and that causes the output device 309 to perform output according to an instruction of the processor 301. The communication I/F 310 is a circuit that controls communication through a network 3. The communication I/F 310 is, for example, a network interface card (NIC), or the like. The SAN I/F 311 is a circuit that controls communication with a storage device connected to the computer 1 by a storage area network. The SAN I/F 311 is, for example, a host bus adapter (HBA) and the like.

The input device 307 is a device that transmits an input signal according to an operation. The input device 307 is, for example, a key device such as a keyboard and a button arranged on a main unit of the computer 1, and a pointing device such as a mouse and a touch panel. The output device 309 is a device that outputs information according to a control by the computer 1. The output device 309 is, for example, an image output device (display device) such as a display, a sound output device such as a speaker, and the like. Furthermore, an input/output device such as a touch screen is applied as the input device 307 and the output device 309. Moreover, the input device 307 and the output device 309 may be integrated into one unit with the computer 1, or may be separate from the computer 1, for example, being a device to be externally connected to the computer 1.

For example, the processor 301 reads a program that is stored in the ROM 303 or the storage medium 305, and performs processing of the accepting unit 110, the search processing unit 120, and the output unit 130 in accordance with a procedure of the read program. At that time, the RAM 302 is used as a work area of the processor 301. The function of the storage unit is implemented by the ROM 303 and the storage medium 305 storing program files (an application program 24, middleware 23, an operating system (OS) 22, and the like described later) and data files (text data, a character string to be matching checked), and by the RAM 302 serving as a work area of the processor 301. The program read by the processor 301 is explained using FIG. 8.

Figure 8:
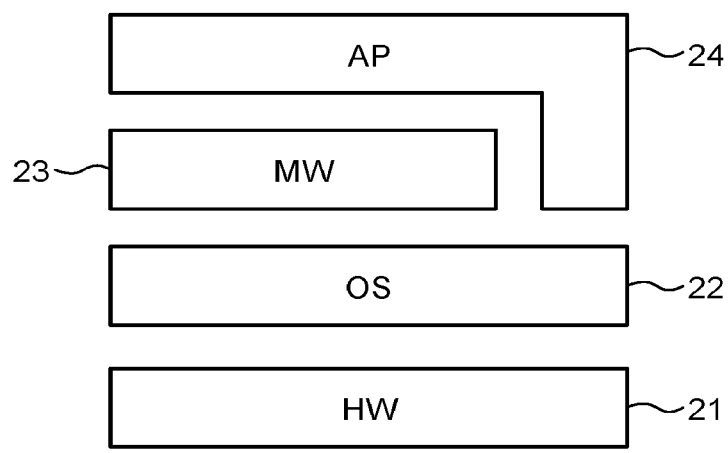
FIG. 8 depicts a configuration example of a program that runs on the computer.

FIG. 8 depicts a configuration example of a program that runs on the computer 1. On the computer 1, the OS 22 that controls a hardware group 21 (301 to 312) depicted in FIG. 8 operates. The processor 301 operates in a procedure according to the OS 22 to control and manage the hardware group 21, thereby performed processing according to the application program 24 or the middleware 23 in the hardware group 21. Furthermore, in the computer 1, the middleware 23 or the application program 24 is read out to the RAM 302, and is executed by the processor 301.

When a searching function is called, the processor 301 performs processing based on at least a part of the middleware 23 or the application program 24, thereby implementing the function of the search processing unit 120 (by controlling the hardware group 21 based on the OS 22 for the processing). The searching function may be included in the application program 24 itself, or may be a part of the middleware 23 that is executed, called according to the application program 24.

Figure 9:
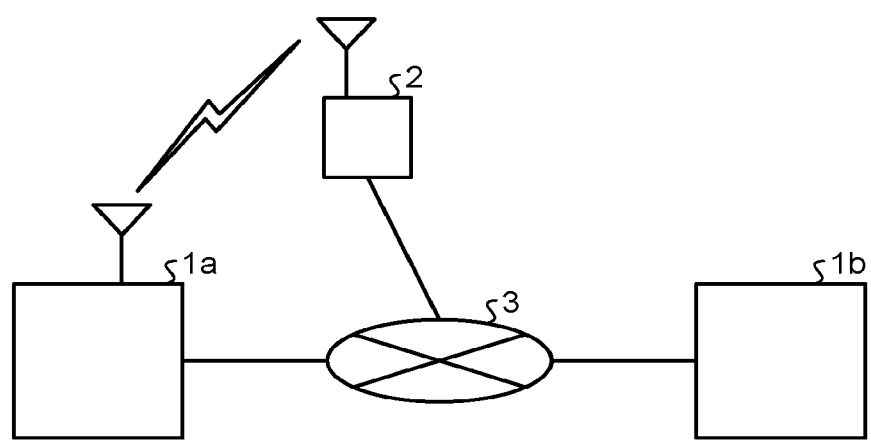
FIG. 9 depicts a configuration example of devices in a system of an embodiment.

FIG. 9 depicts a configuration example of devices in a system of an embodiment. A system in FIG. 9 includes a computer 1a, a computer 1b, a base station 2, and the network 3. The computer 1a is connected, by at least one of wireless and wired connections, to the network 3 to which the computer 1b is connected. The function of the searching device 100 depicted in FIG. 2 may be included in either one of the computer 1a and the computer 1b.

Matching check can be performed at high speed in an encoding system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a searching program that causes a computer to execute a process comprising: converting a searching data into an encoded searching data in a first encoding format according to a predetermined rule;
   comparing a first encoded data with the encoded searching data when the first encoded data is searched, the first encoded data having been encoded in the first encoding format according to the predetermined conversion rule or in a second encoding format according to the predetermined conversion rule; and when the first encoded data is detected to be encoded in the second encoding format during the comparing, converting the first encoded data encoded in the second encoding format to second encoded data encoded in the first encoding format by referring to a code conversion table; and comparing the second encoded data with the encoded searching data, wherein the code conversion table associates data encoded into the first encoding format and data encoded into the second encoding format, wherein data to be encoded into the second encoding format is any one of a two-byte code and a one-byte code, wherein the encoded searching data in a three-byte code format and data to be encoded into the second encoding format are associated with any one of a predetermined word including a space and a character.

2. The non-transitory computer-readable recording medium according to claim 1, wherein the process further comprises:

converting original data into two-byte encoded data in the second encoding format;

converting the second encoded data into three-byte encoded data in the first encoding format based on the predetermined conversion rule when the two-byte encoded data is detected at the searching; and comparing the three-byte encoded data in the first encoding format and the encoded searching data.

3. A searching method that is executed by a computer, the searching method comprising:

converting a searching data into an encoded searching data in a first encoding format according to a predetermined conversion rule;

comparing a first encoded data with the encoded searching data when the first encoded data is searched, the first encoded data having been encoded in the first encoding format according to the predetermined conversion rule or in a second encoding format according to the predetermined conversion rule; and when the first encoded data is detected to be encoded in the second encoding format during the comparing, converting the first encoded data encoded in the second encoding format to second encoded data encoded in the first encoding format by referring to a code conversion table; and comparing the second encoded data with the encoded searching data, wherein the code conversion table associates data encoded into the first encoding format and data encoded into the second encoding format, wherein data to be encoded into the second encoding format is any one of a two-byte code and a one-byte code, wherein the encoded searching data in a three-byte code format and data to be encoded into the second encoding format are associated with any one of a predetermined word including a space and a character.

4. The searching method according to claim 3, further comprising:

converting original data into two-byte encoded data in the second encoding format;

converting the second encoded data into three-byte encoded data in the first encoding format based on the predetermined conversion rule when the two-byte encoded data is detected at the searching; and comparing the three-byte encoded data in the first encoding format and the encoded searching data.

5. A searching device, comprising: a processor configured to:

convert a searching data into an encoded searching data in a first encoding format according to a predetermined conversion rule;

compare a first encoded data with the encoded searching data when the first encoded data is searched, the first encoded data having been encoded in the first encoding format according to the predetermined conversion rule or in a second encoding format according to the predetermined conversion rule; and when the first encoded data is detected to be encoded in the second encoding format during the comparing, convert the first encoded data encoded in the second encoding format to second encoded data encoded in the first encoding format by referring to a code conversion table; and compare the second encoded data with the encoded searching data, wherein the code conversion table associates data encoded into the first encoding format and data encoded into the second encoding format, wherein data to be encoded into the second encoding format is any one of a two-byte code and a one-byte code, wherein the encoded searching data in a three-byte code format and data to be encoded into the second encoding format are associated with any one of a predetermined word including a space and a character.

6. The searching device according to claim 5, wherein the processor is further configured to:

convert original data into two-byte encoded data in the second encoding format;

convert the second encoded data into three-byte encoded data in the first encoding format based on the predetermined conversion rule when the two-byte encoded data is detected at the search; and compare the three-byte encoded data in the first encoding format and the encoded searching data.

* * * * *